United States Patent
Brouwers

(10) Patent No.: US 6,606,530 B1
(45) Date of Patent: Aug. 12, 2003

(54) MULTISTAGE PRODUCTION METHOD AND SYSTEM

(75) Inventor: Franciscus L. M. Brouwers, Nijmegen (NL)

(73) Assignee: Koninklijke Philips Electronics N.V., Eindhoven (NL)

(*) Notice: Subject to any disclaimer, the term of this patent is extended or adjusted under 35 U.S.C. 154(b) by 0 days.

(21) Appl. No.: 09/555,611

(22) PCT Filed: Sep. 30, 1999

(86) PCT No.: PCT/EP99/07486

§ 371 (c)(1),
(2), (4) Date: Jun. 1, 2000

(87) PCT Pub. No.: WO00/20937

PCT Pub. Date: Apr. 13, 2000

(30) Foreign Application Priority Data

Oct. 2, 1998 (EP) .............................. 98203336

(51) Int. Cl.⁷ .............................................. G06F 19/00
(52) U.S. Cl. ...................................... 700/101; 700/101
(58) Field of Search ........................... 700/99–102, 121; 705/7, 8

(56) References Cited

U.S. PATENT DOCUMENTS

| | | | | |
|---|---|---|---|---|
| 5,282,139 A | * | 1/1994 | Kobayashi | .................. 364/468 |
| 5,495,417 A | * | 2/1996 | Fuduka et al. | ............... 364/468 |
| 5,548,518 A | * | 8/1996 | Dietrich et al. | ......... 364/468.06 |
| 5,612,886 A | * | 3/1997 | Weng | .................... 364/468.07 |
| 5,721,686 A | * | 2/1998 | Shahraray et al. | ...... 364/468.08 |
| 5,971,584 A | * | 10/1999 | Iriuchijima et al. | ..... 364/468.07 |
| 6,411,859 B1 | * | 6/2002 | Conboy et al. | .............. 700/101 |

\* cited by examiner

*Primary Examiner*—Albert W. Paladini
*Assistant Examiner*—Sean Shechtman
(74) *Attorney, Agent, or Firm*—Aaron Waxler

(57) ABSTRACT

For a final product a processing flow has a predetermined sequence of processing steps, each mapped on a particular capacity source that may be applied one or more times in the flow. In particular, various control capacity sources are assigned at relative priorities to their control processing steps according to a relatively weighted set of at least two of the following relative ranked priorities:

a. a priority-raising ranked relative Backlog Level for such control processing step with respect to the product in question;

b. a priority-raising ranked Relative Load scarcity for such control processing step with respect to the next applicable control processing step;

c. a priority-raising ranked Relative Load level for the actual processing step;

d. a priority-raising ranked processing step number or nearness of the processing step in question to the end of its process flow.

12 Claims, 3 Drawing Sheets

• CONTROL PROCESSING STEP

Figure 2: single process flow

| step | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|
| equipment group 1 | | | | | | | | | | | | | | | | | | |
| equipment a | | x | | | | | | x | | | | | x | | | | | |
| equipment b | | x | | | | | | x | | | | | | | | | | x |
| equipment c | | | | | | | | x | | | | | | | | | | x |
| equipment group 2 | | | | | | | | | | | | | | | | | | |
| equipment d | x | | | x | | x | | | x | | | x | | | | | x | |
| equipment e | x | | | x | | x | | | x | | | x | | | | | x | |
| equipment group 3 | | | | | | | | | | | | | | | | | | |
| equipment a | | x | | | | | | | | x | x | | | x | | | | |

FIG. 2

Figure 3: multiple process flow

| step | start | B | C | D | E | F | G | H | I | J | K | L | M | N | finish |
|---|---|---|---|---|---|---|---|---|---|---|---|---|---|---|---|
| flow 1 | ----- | ----- | ----- | | ----- | ----- | | | | ----- | ----- | | | ----- | ----- |
| flow 2 | ----- | ----- | ----- | ----- | | | ----- | ----- | ----- | ----- | ----- | | | ----- | ----- |
| flow 3 | ----- | ----- | ----- | ----- | ----- | | ----- | ----- | ----- | | | ----- | ----- | ----- | ----- |
| | | | | | | | | | | | | | | | |
| virtual flow | ----- | ----- | ----- | ----- | ----- | ----- | ----- | ----- | ----- | ----- | ----- | ----- | ----- | ----- | ----- |

FIG. 3

MULTISTAGE PRODUCTION METHOD AND SYSTEM

BACKGROUND OF THE INVENTION

The invention relates to a method as recited in the preamble of claim 1. A non-limiting environment for practicing such method is a silicon factory for manufacturing digital electronic circuitry. Quantitative objectives for such an environment may be specified in terms of high yield expressed as a low percentage of malfunctioning products, a high output expressed in numbers of lots or batches or in broad wordings objects, that will be manufactured per unit of time, and furthermore a high utilization expressed as a percentage of time that the machines are active. Secondary objectives are to minimize total transit time for each particular product, and to finish each particular product at its target instant. The inventor has recognized that time-to-market has become an all-important parameter, that product lifetimes are shortening continually, and that the number of processing steps will increase steadily with the downsizing of layout details and the growing of chip complexity. In manufacturing this leads to a higher control complexity that may cause excessive and non-uniform delays, instabilities, and an unfortunate balance between inventory cost and income. Furthermore, a framework for coping with differentiated transfer times should be feasible.

SUMMARY TO THE INVENTION

In consequence, amongst other things, it is an objective of the present invention to provide manufacturing control management with an improved set of control tools that is applicable to a wide range of product mixes and factory sizes, and that would allow an acceptable user interface and intuitive and straightforward control concepts. Now therefore, according to one of its aspects, the invention is characterized according to the characterizing part of claim 1.

The invention also relates to a multistage processing environment arranged for executing a method as claimed in claim 1. Further advantageous aspects of the invention have been recited in dependent claims.

BRIEF DESCRIPTION OF THE DRAWING

These and further aspects and advantages of the invention will be discussed more in detail hereinafter with reference to the disclosure of preferred embodiments, and in particular with reference to the appended Figures that show:

FIG. 2, a single-product process-step sequence;

FIG. 3, a multi-product process-step sequence;

DISCUSSION OF OPERATIONAL PRINCIPLES OF THE INVENTION

Figure 1:
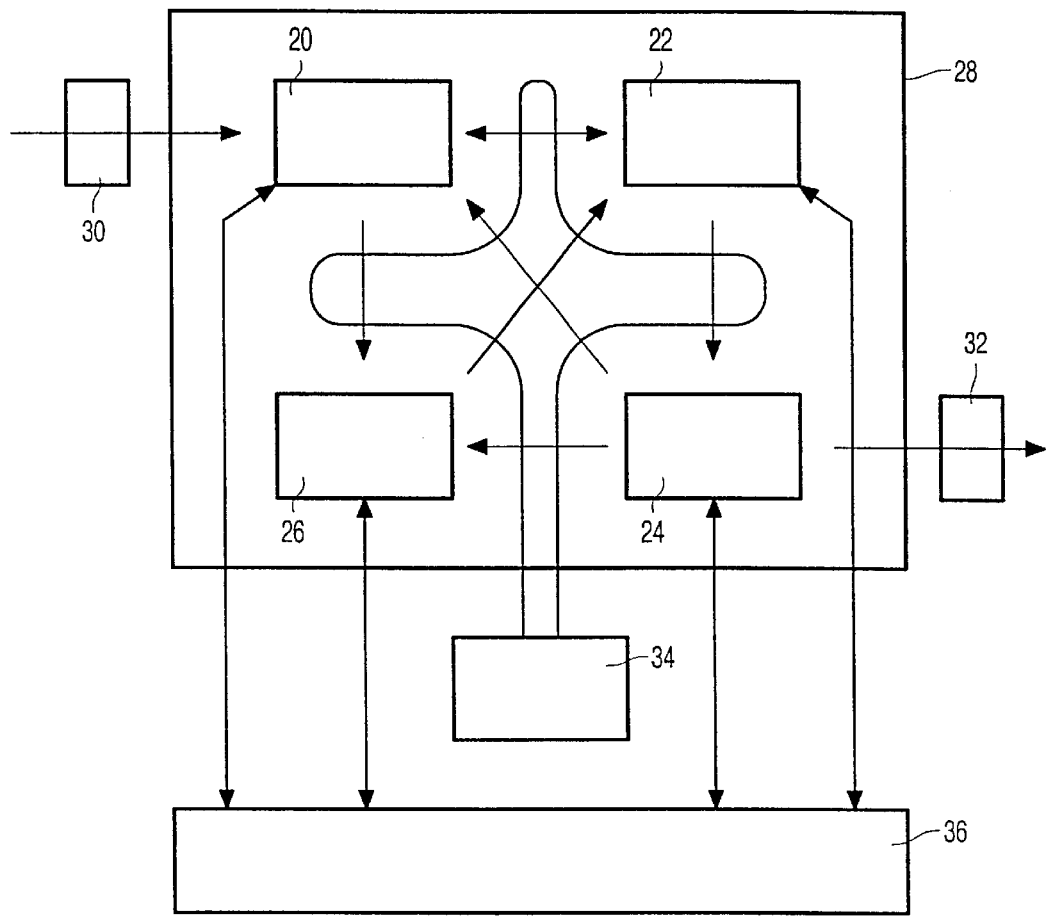
FIG. 1, a block diagram of a semiconductor manufacturing plant.

FIG. 1 is a much-simplified block diagram of a semiconductor manufacturing plant 28 with four different physical processing stages or capacity sources 20–26 that by way of example may correspond to Furnacing, Dry etching, Implanting and Lithography, respectively. Other sets of such physical processing stages are feasible. Input to the plant can be controlled by subsystem 30, and output of finished products can be controlled by subsystem 32. Various arrows symbolize a selection of possible internal transfers between the physical processing stages. For example, next to those shown, transfer from block 20 to block 26 could be forbidden, but transfer from block 24 back to block 22 could be feasible as well. Generally, the total set of paths represents a limited number of preset routes. Products will travel through the respective physical processing stages along routes that can be non-uniform among the various product types. A specific object may repeatedly visit a particular physical processing stage, often after interposed other processing steps. The number of successive processing steps may for sophisticated product types amount to 100 or more. Processing duration among the various processing steps for a particular product, and also among the various products for a single processing step may be non-uniform. A physical processing stage can be distributed over various machines that can operate in parallel on the same or on different types of object. For a particular product, respective processing steps that are executed successively on a particular physical process stage represent instances of that physical process stage. The block diagram further comprises subsystem 34 that controls the routing of the various objects between the various capacity sources. Finally, subsystem 36 effects the selecting from the various objects waiting for a particular equipment or equipments for actual execution of a next processing step. The latter subsystems are connected bidirectionally to the various physical processing stages to receive appropriate manufacturing data.

FIG. 2 is a schematic that introduces a sequence of processing steps for one particular product, presented in a flow-like diagram. In the Figure, the product must undergo 18 successive processing steps. The available equipment or capacity sources are assigned to three groups. Each group may have one or more equipments, and each processing step may be executable on all or on less than all of the equipments of the applicable group, as indicated by crosses. Various steps need only a single equipment. Certain others need no equipment at all, for example if the step implicates just a cooling down or similar laisser faire procedure. As shown, step 2 may be executed on equipments of either group 1 or group 3. Furthermore, a particular equipment may be part of one or more equipment groups. The invention does not consider the nature of the various processing steps.

FIG. 3 shows the sequence of process steps of three different products that are being processed in parallel in the exemplary wafer fab, while perceiving each individual process flow as a respective single "virtual flow", so that each row in FIG. 3 corresponds to a whole version of FIG. 2, without representing an exact counterpart thereto. Various process flows may each pertain to one product. Available equipment groups may be used in more than one flow. The virtual flow combines all flows into one flow as shown. The production target for the flow balancing combines the production targets for all flows together. For example, if the target for stage G equals 5 products per day for flow 2 and 10 products for flow 3, the total target is 15. For a specific product, not all process steps need equipment, as shown by blank positions. The block "finish" indicates the final processing step. In practice, a semiconductor manufacturing flow restricts often to only a uniform sequence of processing steps for all different products, but this is not a strict limitation. For example, it is feasible to have certain products undergo only a first part of the processing steps, so that also intermediate products are made, to be kept in stock until further notice. Also, intermediate tests could throw out or recycle failing objects. Finally, mixed processes on a single manufacturing line will not be ruled out per se.

The invention introduces the concept of a Cycle Time combined with a high utilization of available resources. As used herein, the Cycle Time for a particular product is the time difference between its delivery instant and its commencement instant as expressed in a number of days and/or hours. The utilization of a particular resource is the fraction of available time it is effectively used for manufacturing. Typically, the Cycle Time will rise with increasing utilization of the various resources. The invention aims to restrict such rising.

The invention recognizes the advantage of letting each respective physical processing stage or group of equipments produce a uniform amount of product so that successive physical processing stages will receive a uniform influx of objects. At each processing step and therefore at each resource, this will bring about a high utilization without causing objects to accumulate. Since objects do no longer need to be accumulated to obtain a high utilization, the cycle time for each particular object can be kept low and near to minimum. In a sense, the invention aims to smoothen the flow of objects through the process flow in a way that may be compared to a conveyor belt system used for mechanical coupling between processing steps.

The smoothing of object influx is called flow balancing. The production targets of the various processing steps are used to control the necessary speed of the products over the system. In real life such flow may be hampered frequently, resulting in an uneven spread of objects through the system, and only additional measures will drive the system towards a balanced flow. Such includes the use of buffer targets, wherein the rule restricts the amount of flow if the next processing step has more than enough objects accumulated to meet its production target. In similar manner, the amount of flow can be raised if the amount of accumulated objects before a next processing step is less than required to meet the production target.

Flow balancing leads to a minimum average cycle time. However, for specific objects further cycle time control may be necessary. This may be done by using cycle-time-related priority rules, such as due-date-related priority rules to be discussed hereinafter. The cycle time of each object can be controlled to the extent needed. The need for special short cycle times may be met by for these specific objects overruling the flow balancing system. Note that in an equipment group the various equipments have more or less identical features, so that generally, each equipment is interchangeable with the others. In certain cases, small differences can exist, so that interchangeability is somewhat restricted.

DETAILED DESCRIPTION OF PREFERRED EMBODIMENTS

Figure 5:
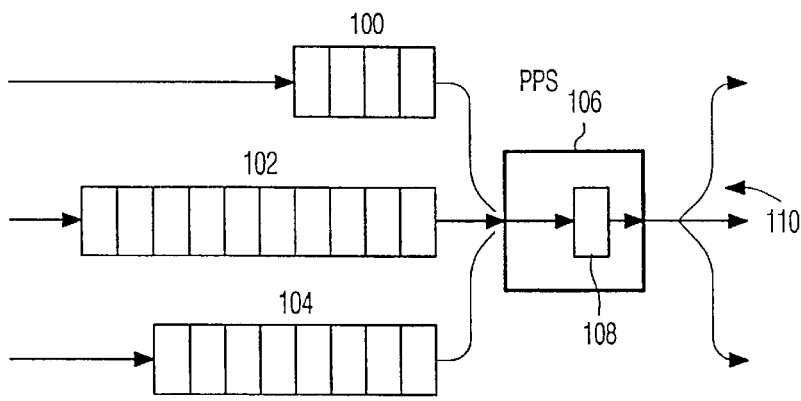
FIG. 5, a single physical processing stage with various loads.

The following procedure defines the priority of the accumulated objects, or in particular, of the production lots for each capacity source or equipment. The procedure is first, to select a particular equipment, and next, to select a particular processing stage, that implies the associated product type. Finally, for the particular processing stage, a particular object or lot is selected. Herein, the term Load will indicate the number of lots that accumulate in front of a group of equipments. In this respect, FIG. 5 shows a single physical processing stage 106 with various Loads. Blocks 100, 102 and 104 symbolize the respective Loads or numbers 4, 10 and 8, of objects, that must be processed in the physical processing stage, being considered to have only one equipment. A further object 108 is actually being processed. After having been processed, each of the three object types leaves for a next physical processing stage, as shown by diverging arrow 110. Block 108 may be counted to one of the Loads, or to a further one not shown, if it is of a different type. Alternatively, it may be counted to one of the queues pertaining to arrow 110, or it may be ignored for simplicity. Now, flow balancing gives priority to processing steps. The flow balancing rules do prioritize among the products various objects queued before a single process step. Additional rules will prioritize these objects, such as by a FIFO mechanism.

Now, the tool defines priority for each processing step as follows. The preferred sequence in a particular resource is defined as the rank of a calculated priority number, the processing step with the lowest number getting priority sequence 1. For example, a priority number may be defined as 04.12.02.01.06, through a hierarchy of successive partial indicators, as follows. In first instance, the initial part of the hierarchy will determine the sequence according to the lowest indicator value. Only in case of equality among these initial parts, the next partial indicator is used, and so on. The sequence among the various partial indicators disclosed hereinafter is being considered as optimum, but various others could be used as an alternative. Also, the number of the partial indicators may be other than four, although at least two is considered a feasible minimum value.

Each partial indicator may be based on one or more items of a relatively weighted set of items. If the weights of two or more items are not far apart, they can be viewed as forming a single partial indicator. If the weights of two items are greatly different however, the limiting situation is that they constitute successive partial indicators of the string recited supra, the greatest weight indicating the hierarchically higher partial indicator. It is not necessary that a particular item is used for determining only a single partial indicator. The following paragraphs have each partial indicator determined by only one unique item.

Now, in an embodiment the first two digits indicate the Backlog rank relative to the production target of the processing step in question. The absolute Backlog are the number of objects that for this processing step must still be processed in a current uniform time interval, such as one day. The Relative Backlog has the absolute Backlog divided by the production target for this same time interval. In the example, the processing stage in question is 12th in rank. This shows that 11 other processing steps have a higher priority for the equipment group in question because of a larger Relative Backlog. If two processing steps have equal Relative Backlogs, they may get the same ranking, which is easily detectable, or be signaled according to a different convention.

The next two digits rank for the processing step in question the size of the Relative Load before the next-following processing step. In general, various objects waiting for the same physical processing stage will after the physical processing stage for which the priority is being determined, proceed to respective different other processing steps, that may be mapped on the same or on different physical processing stages. The processing step of the example ranks second, so there are relatively few objects either waiting in front of, or on the path leading to their next processing stage. The Relative Load relates again to its production target. Thus a Load of 5 lots at production target of 5 per day is perceived as five times higher than a Load of 20 lots at a production target of 100.

The next two digits indicate the Relative Load in front of the processing step for which the priority is being calculated.

Also this is a rank number among the various quantities. In the example the actual object has the greatest Relative Load of all processing steps.

The last two digits indicate a ranked sequence number of the processing step in the processing flow in question. This number is so calculated that a processing step nearest to the end of its processing flow gets highest priority. Alternatively, the processing step farthest from its starting point may get the highest priority. The absolute distance may be expressed in a number of steps or in another manner. The example indicates that five other object types have processing steps that are nearer to their respectively termination. For manufacturing intermediate products, various tactics for the above determining are feasible.

Figure 4:
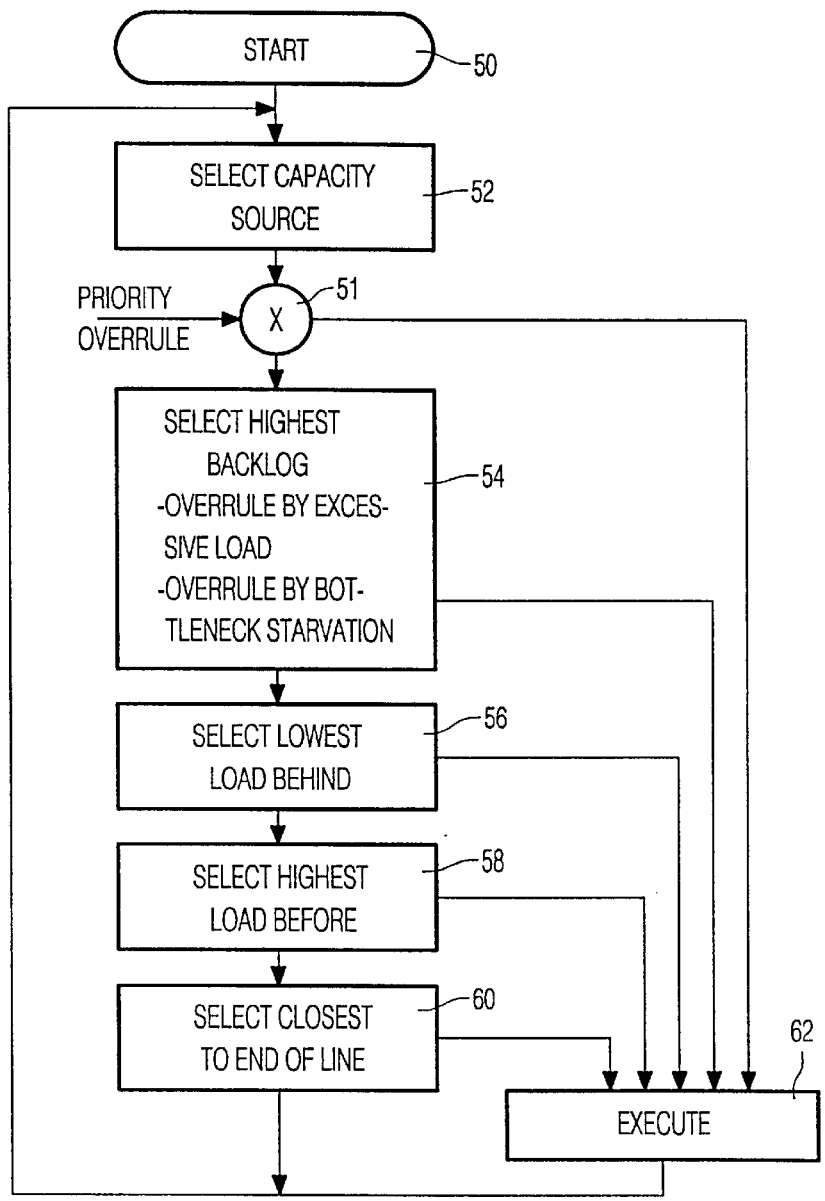
FIG. 4, a flow diagram of the selection process.

FIG. 4 is a flow diagram of the selection process. In block 50, the procedure begins by assigning the necessary hardware and software facilities. In block 52 one of the capacity sources or equipments is selected according to an appropriate schedule such as round robin, or by detecting which one has become ready to start a next processing step. In block 54, the processing step with the highest Relative Backlog is selected according to the foregoing. If inconclusive, in block 56 the processing step with the lowest Relative Load behind it is selected. If inconclusive, in block 58 the processing step with the highest Relative Load before it is selected. If inconclusive, in block 60 the processing step closest to its flow termination is selected. The selecting may in various different manners be overruled. First, if a particular object is a Priority Object, in switch 51 processing thereof is started as soon as possible. In block 54, excessive Load before, or an impending Bottleneck Starvation behind a particular processing step will also control immediate execution of such processing step. If any of blocks 54, 56, 58, 60 generates a clear choice, in block 62 the associated processing step is executed, and the decision system goes to the next capacity source in block 52. If none of the four blocks presents a clear choice, another selection procedure may be effected, such as random among those objects having equal rank, waiting a short time for a clear outcome to evolve, taking into account still further criteria, etcetera.

The priority ranking may be executed for all equipment groups, or only for selected control equipment groups. Furthermore, the priority ranking may be executed for all processing steps, or only for selected control processing steps. At other than control equipment groups, priority setting will be based on rules which do not influence the overall flow to a large extent, such as those based on First-In-First-Out.

SPECIAL FURTHER MEASURES

Priorities calculated according to the above may be supplemented by several extra rules, such as:

The backlog with respect to production target. The basic procedure will still consider backlogs of processing steps that have already met their production targets by far. A countermeasure is to restrict to a minimum backlog value of −20%, that is actual production of 20% above target. If production is more than 20% above target, priority calculation will be based on 20% above target. The threshold of −20% has been found by trial and error.

An excessive absolute or relative Load accumulating in front of the next relevant processing stage; this may boil down to implementing a branch in the flow chart (Cf. 51), and the amending of the various weighting factors, or changing the priority number. This imbalance in Load is solved by overruling the Backlog calculation to the production target. In particular, this is done by setting the backlog to −100% in case the Load exceeds a preset maximum. Thus the processing step in question will rank at the end of the priority queue, and no capacity will be used to increase an already excessive Load at the next processing step.

Bottleneck starvation may be avoided by overruling the calculated backlog-to-production target, by setting the backlog to +200% if the Load before the next processing step is lower than a preset minimum. In this way the leading part of the priority number is set to 1 if a succeeding bottleneck is in danger of having zero Load.

The targets are set periodically, such as monthly. A stable system is maintained in that targets are not adjusted to the problems of the day. The processing step priority setting will correct for the consequences of day-to-day problems, such as equipment breakdown.

The concept calculates a priority for a processing stage. Since equipments are used for various different processing steps, the priority for a particular equipment in a group is equal to the highest priority of any processing step to be executed by such equipment. This concept is used if there are insufficient operator persons to serve all equipments requiring attention. The equipment with the highest priority will then be served first; other selected processing steps may have their execution delayed for some time.

Additionally to the flow balancing concept, the lot priority concept is incorporated. According to the required Cycle Time, lots may be assigned to Priority Classes. Each Priority Class gets a Cycle Time target. Lots require a higher priority based on the backlog to reach the Cycle Time target. This is done by standard due-date related scheduling rules.

Special high Priority Classes 1 and 2 may be used to control lots that must have a special short Cycle Time, e.g. as fast as possible. Again this is done by standard due-date related scheduling rules. To prioritize these lots, a special target cycle time is set to a minimum level near to zero.

Both flow balancing and lot priority methods can be combined into a single set of rules. These rules strive for a short average cycle time by means of flow balancing, as well as for a cycle time close to the target cycle time for each lot, such as according to:
  first: lots in priority class 1
  second: lots in priority class 2
  third: other lots according to:
    select the processing stage with the highest priority within that processing stage, select the lot with the highest backlog.

What is claimed is:

1. A method for with respect to a first final product operating a processing flow that contains a predetermined sequence of processing steps, each step being mapped on a particular capacity source that may be applied one or more times in the flow,
  said method being characterized by assigning at various control capacity sources relative priorities to its mapped control processing steps according to a relatively weighted set of at least two among the following relative ranked priorities:
    a. a priority-raising ranked Relative Backlog Level for such control processing step with respect to the product in question;
    b. a priority-raising ranked Relative Load for such control processing step with respect to the next applicable control processing step;
    c. a priority-raising ranked Relative Load for the actual processing step;

d. a priority-raising ranked processing step number or nearness of the processing step in question to the end of its process flow.

2. A method as claimed in claim 1, wherein at least pat of said relatively weighted set forms a hierarchically ranked string of at least two levels.

3. A method as claimed in claim 1, wherein said set has its weights successively decreasing in a direction from a to d.

4. A method as claimed in claim 1, said set comprising all four items a to d.

5. A method as claimed in claim 1, and having a priority lowering measure for any control processing step having a predetermined over-production level above its target.

6. A method as claimed in claim 1, and having a priority lowering measure for any control processing step featuring a predetermined excessive Load level for its next successive processing step.

7. A method as claimed in claim 1, and having a priority raising measure for any control processing step featuring a predetermined undersize Load level for its next successive control processing step.

8. A method as claimed in claim 1, wherein at least one capacity source is distributed over various equipments, and prioritizing each equipment separately.

9. A method as claimed in claim 1, whilst allowing any selected processing step to be delayed temporally.

10. A method as claimed in claim 1, and using one or more FIFO mechanisms at undecided process instances.

11. A method as claimed in claim 1, whilst constituting a combined virtual processing flow from a plurality of parallel single processing flows.

12. A multistage processing system being arranged for executing a method as claimed in claim 1.

* * * * *